UNITED STATES PATENT OFFICE.

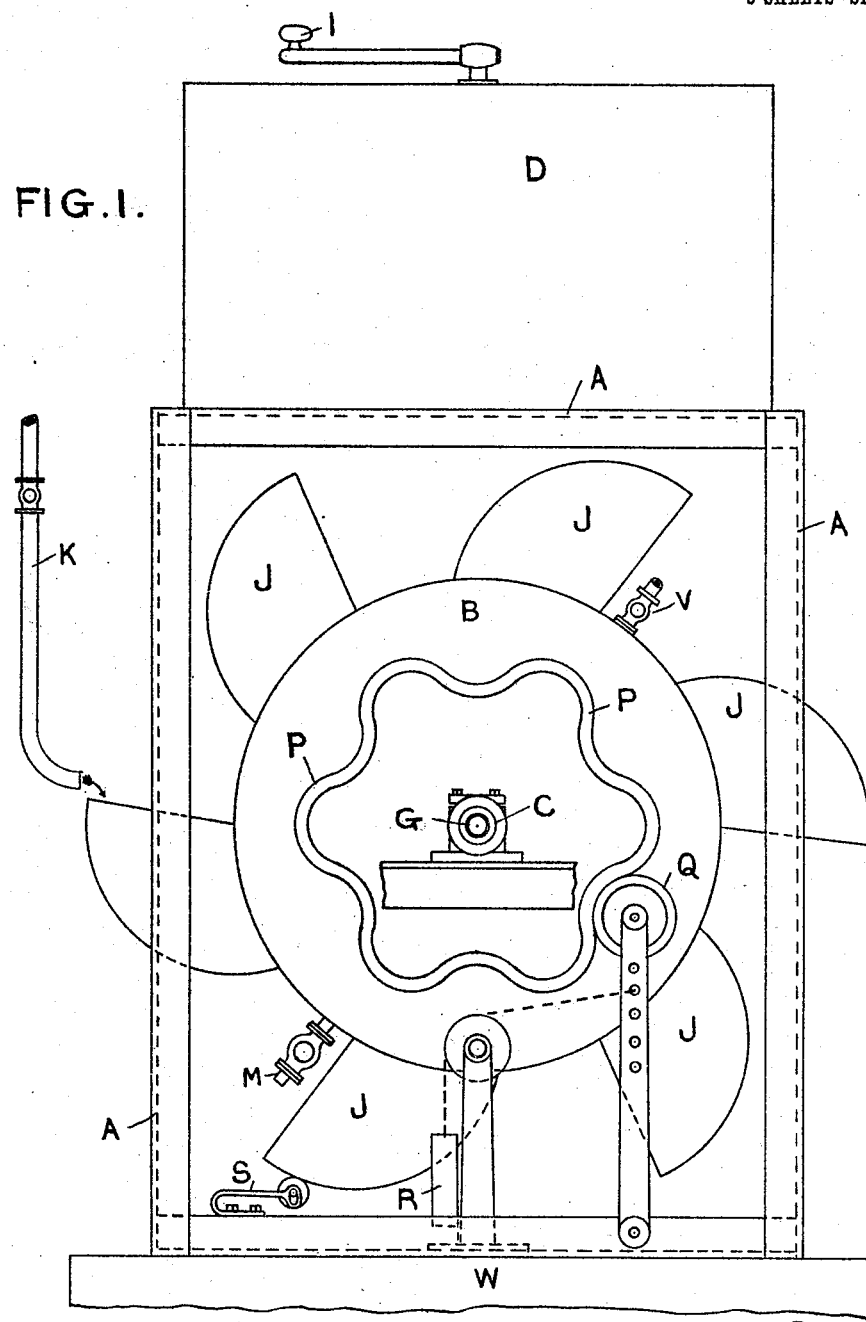

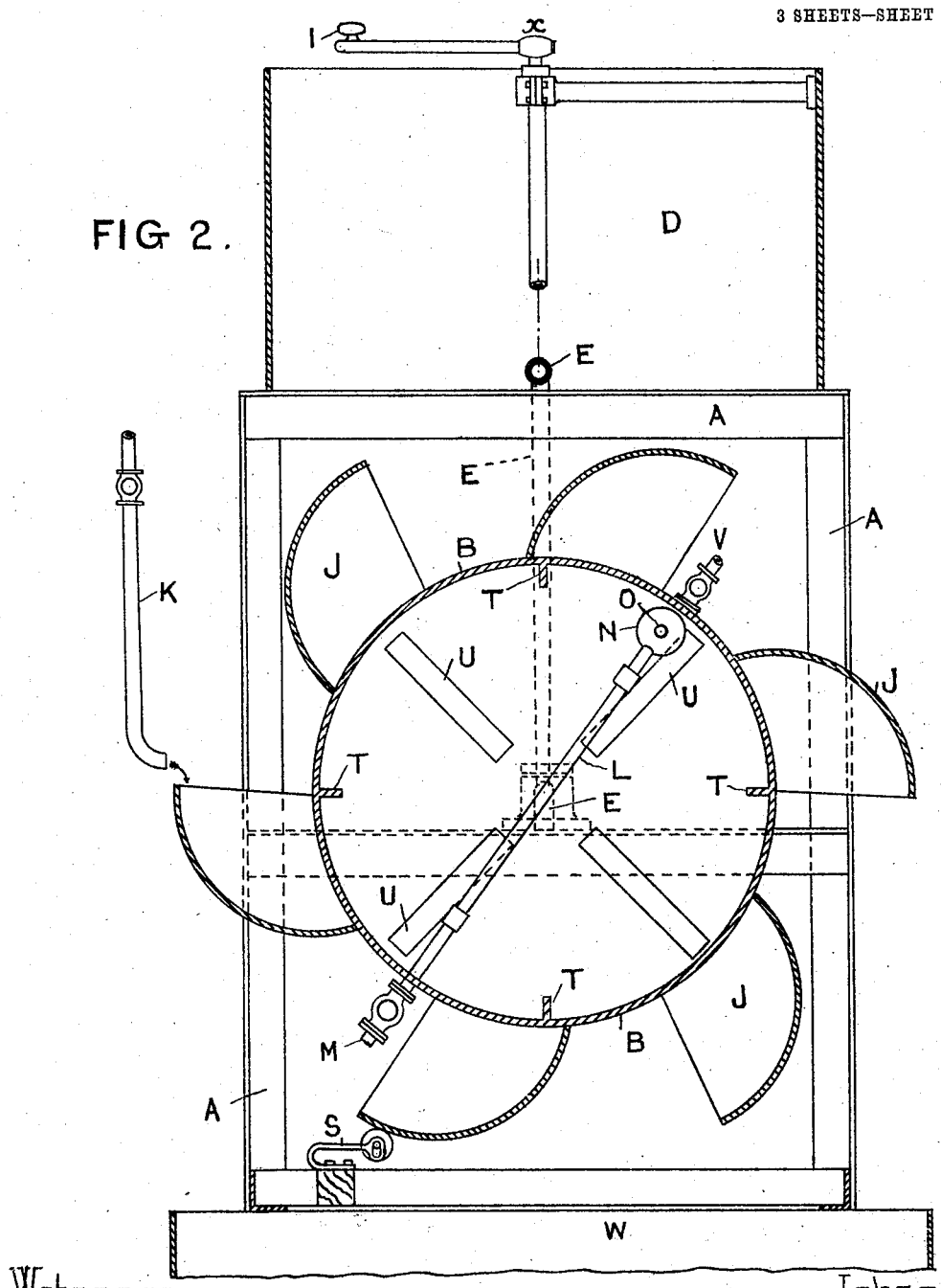

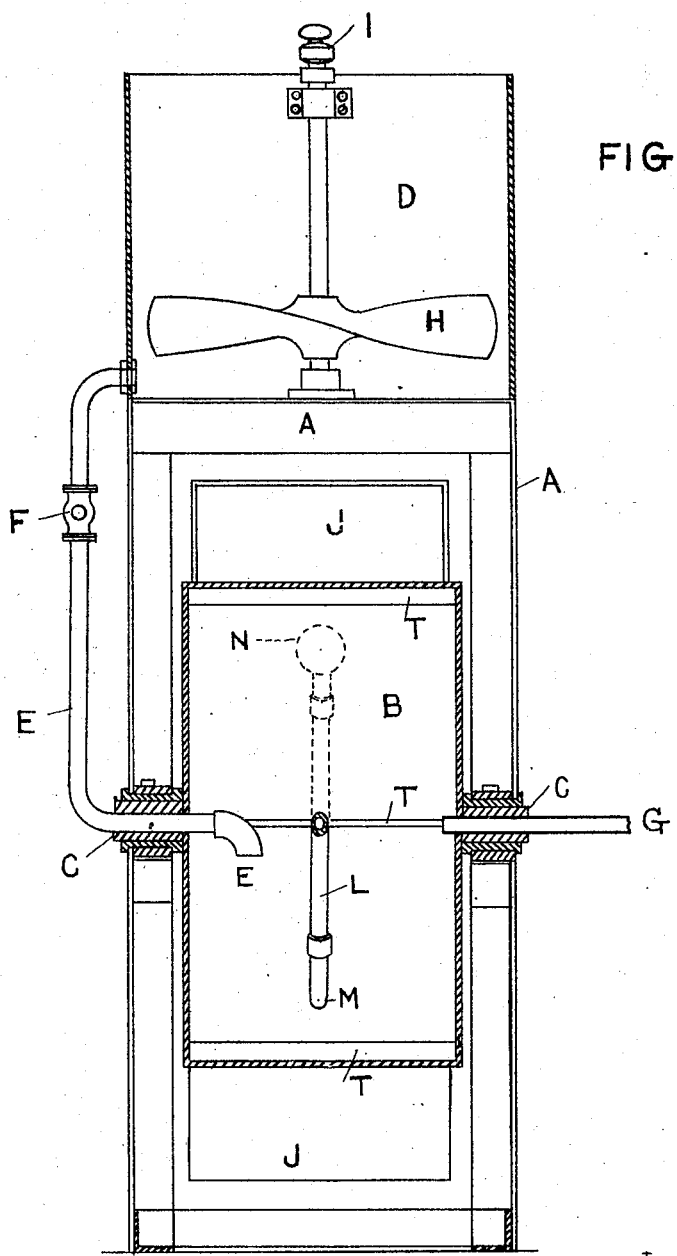

HERBERT SPENCER FLYNT, OF SALE, ENGLAND.

APPARATUS FOR SOFTENING WATER.

No. 800,287.          Specification of Letters Patent.          Patented Sept. 26, 1905.

Application filed June 1, 1905. Serial No. 263,226.

*To all whom it may concern:*

Be it known that I, HERBERT SPENCER FLYNT, a subject of the King of Great Britain and Ireland, residing at "Rose Mount," Grange Road, Sale, in the county of Chester, England, have invented a new and useful Improvement in Apparatus for Softening Water, of which the following is a specification.

This invention has for its object an apparatus for automatically softening water or for otherwise automatically mixing a predetermined percentage of solution with the water to be treated. I may, for example, cause a suitable proportion of calcium hydrate and carbonate of soda to be mixed with the water to be treated; but the precise nature of the chemicals employed may vary according to the impurities in the water.

In the drawings, Figure 1 is a side elevation of an apparatus constructed in accordance with my invention. Fig. 2 is a section thereof, and Fig. 3 is a section as on line $x\ x$ of Fig. 2.

A is the framework of the machine, and B is a cylindrical drum adapted to revolve on trunnions C. At the upper part of this framework is a tank D, which is supplied at suitable intervals with the solution. A pipe E connects the tank with the interior of the drum, as clearly shown in Fig. 3, and is provided with a cock F, by means of which the supply may be regulated. G is an overflow. In practice the drum B should never be more than one-third full about, and this overflow only comes into use in case or cases of emergency. A drain-cock V, Fig. 2, is provided for use when the drum is being washed out.

H (see Fig. 3) is an agitator or stirrer by means of which the contents of tank D may be stirred up, and I is a handle by which said stirrer may be turned.

Around the circumference of the drum B I provide a series of buckets J, and these are supplied with water one at a time by means of the supply-pipe K. As soon as one of the buckets has received sufficient water the weight thereof causes the drum B to revolve one step, and another empty bucket J then takes its place and in turn receives a supply, and so on. The buckets as they descend automatically discharge their contents into a settling and filtering tank W below. This settling and filtering tank forms no part of my invention. At each revolution of the drum a small quantity of solution is also discharged from the drum into the settling-tank, and this is effected as follows: Within the drum I provide a measuring-pipe L, the outer end M whereof sticks out through the side of the drum, as shown, and the opposite end whereof carries a measure N, which in the example shown consists of a hollow sphere having a perforation O through it. This measuring-pipe L and sphere N are rigidly attached to the drum B and revolve with it, so that it will be seen that every time the measure N is dipped down so as to get below the surface of the solution in the drum it becomes filled with said solution, and as soon as it rises above the surface thereof the surplus rushes out through the hole O, and on revolving still further the solution contained within said measure N runs out of the opening M to the water in the settling and filtering tank W. Windows U are provided in the drum, whereby the level of the solution therein may be readily seen.

In some cases instead of the round holes O I may have a slit or similar orifice, the function in either case being to prevent the measure N being more than half full when it has risen above the surface of the solution.

In order to check the revolution of the drum, I provide a corrugated rib P, which is engaged by a detent-bowl Q, and this is in turn kept up to its work by means of a weight R in obvious manner, (see Fig. 1,) and I prefer also to provide an adjustable spring-brake S (see Figs. 1 and 2) which tends to prevent overrunning of the buckets J.

T (see Figs. 2 and 3) represents ribs or stirrers affixed within the drum B, and they serve to carry up and thence throw down the undissolved portion of the purifying chemicals.

It is to be stated that while I have described apparatus which is the best known to me to effect the objects of this invention it is obvious that the particular construction and arrangement of parts may be varied and modified to suit varying requirements and conditions of working.

What I claim as my invention, and desire to secure by Letters Patent, is—

1. In apparatus for purifying or softening water, the combination of a hollow drum adapted to contain the purifying solution, and which is provided on its exterior with buckets by means of which it may be turned round step by step because of the water to be treated being fed into said buckets, means for feeding the purifying solution into said drum, and a pipe located within said drum one end of which projects therethrough and the other of which is provided with a measuring vessel; substantially as described and shown.

2. In apparatus for purifying water in which a drum revolved by buckets attached thereto is used, a measuring-pipe revolving therewith and whose interior end carries a measuring vessel which is adapted to carry up a quantity of solution at each revolution, and to allow any surplus to escape back into the drum, and to discharge the measured quantity into the water to be purified; substantially as described.

3. In apparatus for purifying water which comprises a rotatable drum to contain the purifying solution, buckets arranged around said drum, and by means of which it is turned, an adjustable detent-gearing to control its revolution so that it takes place step by step in accordance with the quantity of water fed; substantially as described and shown.

In testimony whereof I have signed my name to this specification in the presence of two subscribing witnesses.

HERBERT SPENCER FLYNT.

Witnesses:
  CHAS. COVENTRY,
  THOS. NUGENT.